United States Patent
Bollam et al.

(10) Patent No.: US 11,449,597 B2
(45) Date of Patent: Sep. 20, 2022

(54) TRANSPOSED PASSWORDS

(71) Applicant: Hewlett Packard Enterprise Development LP, Houston, TX (US)

(72) Inventors: Lavanya Bollam, Bangalore (IN); Yashavantha Nagaraju, Bangalore (IN); Sharath Srikanth Chellappa, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 645 days.

(21) Appl. No.: 16/166,337

(22) Filed: Oct. 22, 2018

(65) Prior Publication Data
US 2020/0125718 A1    Apr. 23, 2020

(51) Int. Cl.
G06F 21/31    (2013.01)
G06F 21/45    (2013.01)

(52) U.S. Cl.
CPC .............. G06F 21/45 (2013.01); G06F 21/31 (2013.01)

(58) Field of Classification Search
CPC .......... G06F 21/45; G06F 21/46; G06F 21/31; G06F 21/36; G06F 21/316; G06F 3/0482; H04L 63/083; H04L 63/10
See application file for complete search history.

(56) References Cited

U.S. PATENT DOCUMENTS

| | | | |
|---|---|---|---|
| 8,549,314 B2 | 10/2013 | Mahmoud et al. | |
| 9,407,632 B2 | 8/2016 | Agarwal | |
| 9,521,142 B2 | 12/2016 | Xavier et al. | |
| 9,590,808 B2* | 3/2017 | Jiang | H04L 9/3226 |
| 9,923,876 B2 | 3/2018 | Nahari | |
| 10,262,129 B1* | 4/2019 | Gupta | G06F 16/3344 |
| 2005/0273625 A1* | 12/2005 | Dayan | G06F 21/31 713/184 |
| 2009/0249447 A1* | 10/2009 | Ogawa | H04L 9/3226 726/4 |
| 2014/0040627 A1* | 2/2014 | Logan | G06F 21/46 713/182 |
| 2018/0121655 A1* | 5/2018 | Abene | G06F 21/567 |

OTHER PUBLICATIONS

What is the Use of a Client Nonce?, (Web Page), Retrieved Aug. 24, 2018, 7 Pgs.

* cited by examiner

*Primary Examiner* — Fatoumata Traore
*Assistant Examiner* — Hamid Talaminaei
(74) *Attorney, Agent, or Firm* — Brooks, Cameron & Huebsch, PLLC

(57) ABSTRACT

Example implementations relate to transposed passwords. A computing device may comprise a processing resource; and a memory resource storing machine-readable instructions to cause the processing resource to: receive an entered password; generate, based on the entered password, a transposed version of the entered password; compare the transposed version of the password to a stored password; and grant access based on the comparison.

13 Claims, 5 Drawing Sheets

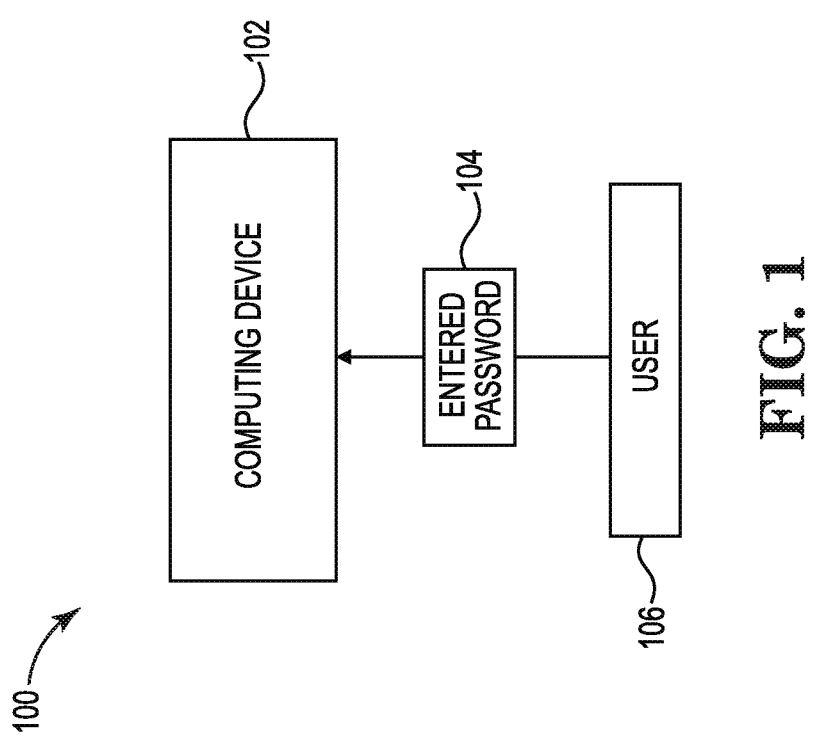

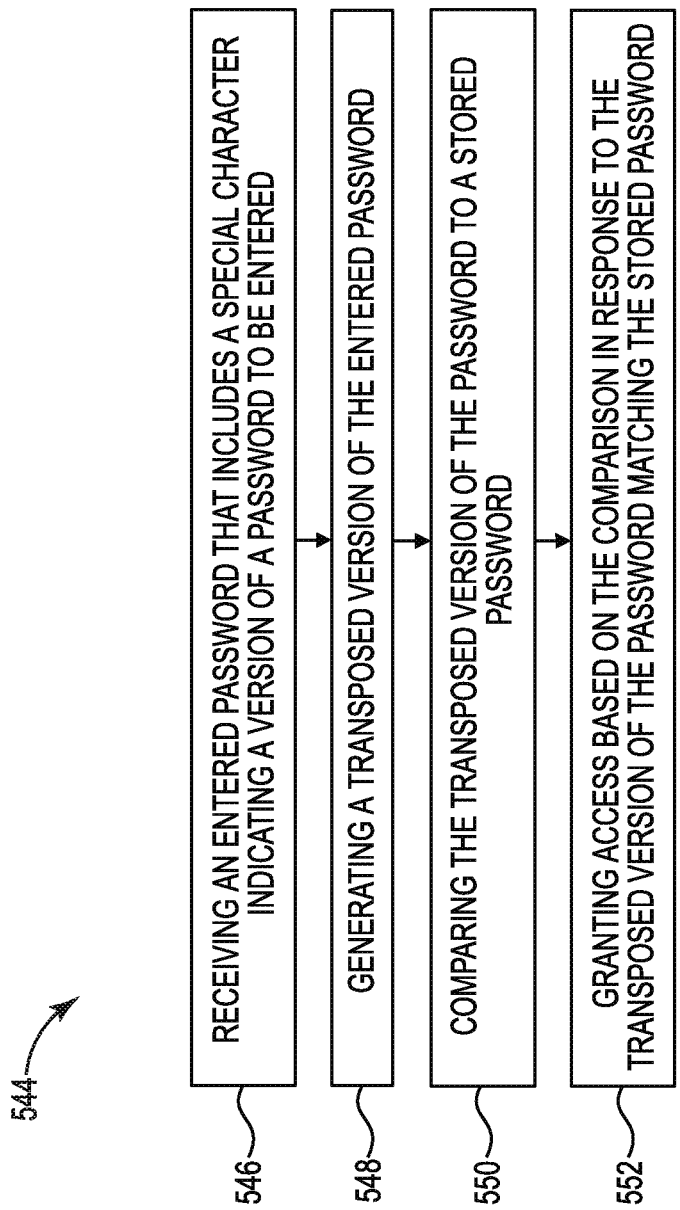

TRANSPOSED PASSWORDS

BACKGROUND

In some computing systems, passwords can provide a secure mechanism to access components of computing systems, such as computing devices. For example, a password can be entered in order to access sensitive information, such as control and/or configuration mechanisms, as well as other information associated with a computing device. Access to the computing device can be restricted by a password to prevent unintentional release of sensitive information by unauthorized persons.

BRIEF DESCRIPTION OF THE DRAWINGS

FIG. 1 illustrates an example system consistent with the disclosure.

FIG. 5 illustrates an example method consistent with the disclosure.

DETAILED DESCRIPTION

Figure 2B:
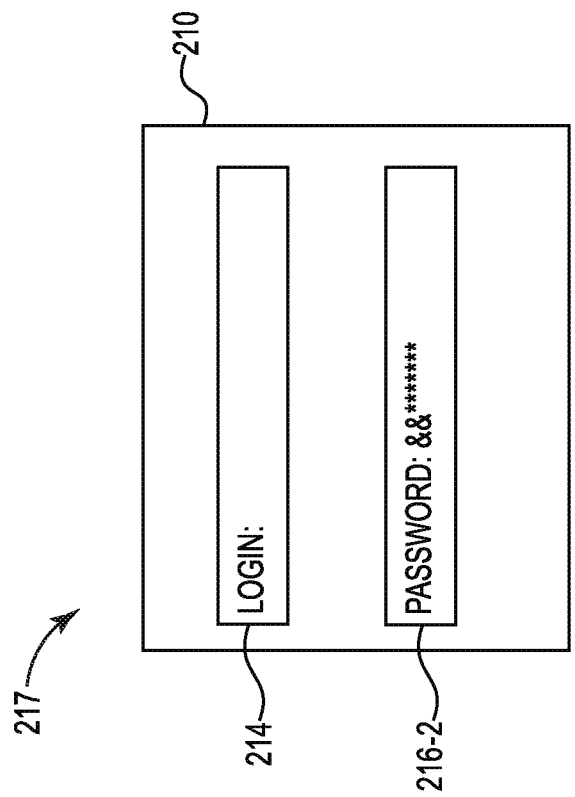
FIG. 2B illustrates an example user interface consistent with the disclosure.

In computing systems, a password can provide for restricted access to a computing device to authorized persons. Restricting access to authorized persons can provide security for a computing system. For example, some computing systems may store sensitive information, and restricting access to authorized persons can provide security against the sensitive information being released. As used herein, the term "password" refers to a string of characters used for user authentication to provide identity or access approval to gain access to a resource. For example, a password can be a string of characters to authenticate a user attempting to gain access to a computing device.

A user can enter a password by a user input. For example, a user may enter a password to a computing device by typing the password via a user input. The user may type the password by utilizing a peripheral device to the computing device, such as a keyboard, type the password by utilizing a touch screen display, among other types of user inputs.

As used herein, the term "computing device" can, for example, refer to a device including a processor, memory, and input/output interfaces for wired and/or wireless communication. A computing device may include a laptop computer, a desktop computer, a mobile device, and/or other wireless devices, although examples of the disclosure are not limited to such devices. A mobile device may refer to devices that are (or may be) carried and/or worn by a user. For instance, a mobile device can be a phone (e.g., a smart phone), a tablet, a personal digital assistant (PDA), smart glasses, and/or a wrist-worn device (e.g., a smart watch), among other types of mobile devices.

Typing a password into a computing device can be an intuitive way for an authorized user to input a password to gain access to a computing device. However, when typing a password, an unauthorized user may be able to observe an authorized user type the password. For example, during a snooping attack, an unauthorized user may observe an authorized user enter a password by noting which keys are pressed and/or in which order they are pressed when entering a password. In this way, an unauthorized user may be able to determine a password in order to gain unauthorized access to a computing device.

Transposed passwords according to the disclosure can prevent an unauthorized user from determining a password to gain unauthorized access to a computing device during a snooping attack. According to examples of the disclosure, transposed passwords can be utilized to allow for different versions of a password to be entered in order to prevent an unauthorized user from observing a password being input to a computing device. Different versions of a password can include changing a relative position, order, or sequence of characters comprising a password. Accordingly, the sequence in which characters comprising the password are entered can allow for many different versions of a password. The different versions of the password to be entered can prevent a snooping attack from compromising a computing device and/or a computing system including the computing device.

FIG. 1 illustrates an example system 100 consistent with the disclosure. As illustrated in FIG. 1, the system 100 can include computing device 102, entered password 104, and user 106.

As illustrated in FIG. 1, user 106 can enter an entered password 104 into computing device 102. As used herein, the term "entered password" refers to a string of characters entered by the user into computing device 102. User 106 can enter the password 104 into computing device 102 via a user input. For instance, user 106 can enter the password into computing device 102 via a peripheral device such as a keyboard or may utilize a touch screen display of the computing device 102, among other types of user inputs.

User 106 can enter a password 104 in order to access information included in computing device 102. However, as described above, an unauthorized user may attempt to observe user 106 entering password 104. Accordingly, user 106 can enter a version of a password that can be indicated by a displayed character via a display of computing device 102, or user 106 can enter a version of a password that can be indicated via a special character included in the entered password 104, as is further described herein.

Although not illustrated in FIG. 1 for clarity and so as not to obscure examples of the disclosure, computing device 102 can include a display. As used herein, the term "display" refers to a device to provide (e.g., display and/or present) information to the user 106 of computing device 102, and/or receive information from (e.g., input by) the user 106 of computing device 102. In some examples, the display can be a graphical user interface (GUI) that can provide information to and/or receive information from the user 106 of computing device 102. The display can be, for instance, a touch-screen (e.g., the GUI can include touch-screen capabilities). Alternatively, the display can be a television, computer monitor, mobile device screen, other type of display device, or any combination thereof, connected to computing device 102 and able to receive a video signal output from the computing device 102.

The display of computing device 102 can display a character to indicate a version of a password to be entered. As used herein, the term "character" refers to a unit of information that corresponds to a symbol included in an alphabet or syllabary in a digitally written form. For example, the display of computing device 102 can display an ampersand (e.g., "&") to indicate a version of a password to be entered by user 106. As used herein, the term "version" refers to a particular variant of an item. For example, the character can indicate a particular variant of a password to be entered by user 106 to computing device 102. Further, although described above as displaying a single character to indicate the version of the password to be entered, examples of the disclosure are not so limited. For example, the character "&&", "^&", or any other character or combination of characters can indicate a version of a password to be entered. In some examples, the displayed character can be a user defined character or set of characters.

In some examples, the displayed "&&" character can indicate the version of the password is to be the password entered in reverse. The character(s) or combination of characters displayed can be predetermined and known by user 106. The password for computing device 102 may be "test". For example, the display of computing device 102 can display the characters "&&". This can indicate to user 106 to enter the password in reverse. That is, user 106 can input password 104 to computing device 102 as "tset".

In some examples, the displayed "&&" character can indicate the version of the password is to be entered in a k and n-k character swap, where k is the position of the letter and n is a user defined quantity that can be equal to or less than a number of characters in the password. The password for computing device 102 may be "test1234". For example, the display of computing device 102 can display the characters "&&". This can indicate to user 106 to enter the password in a k and n-k character swap fashion. For example, n can equal 8 (e.g., a number of characters in the password) and k can equal 3 (e.g., a constant that can be selected by the user when the user predetermines the meaning of characters "&&", where k<n and k>0). By displaying the characters "&&", the password "test1234" can be entered by swapping the 3rd and 5th [i.e. 8-3] characters. That is, user 106 can input password 104 to computing device 102 as "te1ts234".

In some examples, the displayed "&&" character can indicate the version of the password is to be entered is such that the password is to start on a particular character of the password. The password for computing device 102 may be "test". For example, the display of computing device 102 can display the characters "&&". This can indicate to user 106 to enter the password starting at the third character and, when finished, beginning at the first character up to but not including the third character. That is, user 106 can input password 104 to computing device 102 as "stte".

In some examples, the displayed character that dictates the version of the password to be entered can be modified. For example, as described above, the character "&&" can dictate the password is to be entered in reverse. However, examples of the disclosure are not so limited. For example, computing device 102 can modify the character (e.g., in response to a user input, after a predetermined amount of time, after a predetermined number of input attempts, etc.) such that the version of the password to be entered can be changed. For example, the displayed character "&&" can have previously indicated the password should be entered starting from the third character. Computing device 102 can modify the character "&&" from indicating the password should be entered starting on the third character to "$#", which can indicate the password should be entered starting on the second character, among other examples.

Although the version of the password is described above as including the password entered in reverse, a k and n-k character swap, and/or starting the password on a particular character of the password, examples of the disclosure are not so limited. For example, the version of the password to be entered can be any other version.

Computing device 102 can receive entered password 104. For example, as described above, user 106 can enter a version of the password to computing device 102 based on the displayed character via a user input to computing device 102. That is, the entered password 104 is based on the character that indicates the version of the password to be entered.

Computing device 102 can generate, based on the entered password 104, a transposed version of the entered password 104. As used herein, the term "transpose" refers to changing at least a relative position, an order, or a sequence of characters of a password. Accordingly, a transposed password can be a password having the relative position, order, or sequence of characters being changed. For example, computing device 102 can change the relative position, order, and/or sequence of the string of characters comprising the entered password 104, as is further described herein.

Computing device 102 can generate the transposed version of the entered password 104 based on the displayed character (e.g., as described above). Computing device 102 can generate the transposed version of password 104 by performing a transpose operation on entered password 104 based on the displayed character, as is further described herein.

In some examples, the transpose operation can include reversing characters of the entered password 104. For example, as described above, the "&&" character can indicate the version of the password is to be entered in reverse (e.g., password is "test", entered password 104 is "tset"). The transpose operation performed by computing device 102 can include reversing the characters of entered password 104 (e.g., "tset" to "test") to derive the user credential to be used during an authentication process. In other words, the string of characters to be used in the authentication process for user 106 is different from the password 104 as entered by user 106. Rather, the string of characters to be used in the authentication process for user 106 is derived from the password 104 based on a predefined password transposition rule. One or more unique corresponding prompt characters are displayed to the user to provide a hint on the predefined password transposition rule.

In some examples, the transpose operation can include reversing a k and n-k character swap, where n is the total number of characters in a password string and k is any number less than n and greater than zero. In the event the password transposition rule defines swapping the first k characters and the next n-k characters in a password string, the transposition operation can swap the first n-k characters and the next k characters in the input password, thereby reversing the k and n-k character swap. For example, as described above, the "&&" character can indicate the version of the password is to be entered in a k and n-k character swap (e.g., password is "test", entered password 104 is "ttes" when k equals 3). The transpose operation performed by computing device 102 can include reversing the characters of entered password 104 (e.g., "ttes" to "test").

In some examples, the transpose operation can include reversing characters of the password 104. For example, the "n" character can indicate the version of the password is to be entered by starting the password on a particular character of the password (e.g., password is "test", password 104 starts on the third character such that the entered password 104 is "stte"). The transpose operation performed by computing device 102 can include reversing the characters of entered password 104 (e.g., "stte" to "test"). In general, where the length of a password string is n and the password transposition rule specifies to enter the password from the $k^{th}$ character in the password and followed by the $1^{st}$ to the $(k-1)^{th}$ character after the $n^{th}$ character is entered, the transpose operation can reverse the password inputs to obtain the password for authentication by starting from the $(n-k+2)^{th}$ character followed by the $1^{st}$ to the $(k-n+1)^{th}$ character after the nth character is read.

Although the version of the password can be indicated by a displayed character via a display of computing device 102, examples of the disclosure are not so limited. For example, user 106 can enter a special character included in the entered password 104 to indicate a version of the password to be entered, as is further described herein.

User 106 can enter a password that can include a special character that indicates the version of the password that is entered. For example, the special character can indicate a particular variant of the password that is entered by user 106 to computing device 102. The special character can indicate the particular version of the password that is entered, but computing device 102 can be disregarded from consideration as a character of the password, as the special character dictates the version of the password but is not a character included in the password.

In some examples, the "&&" character can indicate the version of the password is entered in reverse. For example, the password for computing device 102 may be "test". The user 106 can enter the special character and then enter the password in reverse. That is, user 106 can input entered password 104 to computing device 102 as "&&tset", where the "&&" character indicates to computing device 102 the entered password 104 is entered in reverse.

In some examples, the "##" character can indicate the version of the password is entered in a k and n-k character swap, where k is the position of the letter and n is the total number of letters in the password. For example, the password for computing device 102 may be "test1234". The user 106 can enter the special character and then enter the password in a k and n-k character swap fashion. For example, n can equal 8 (e.g., a number of characters in the password) and k can equal 3 (e.g., a constant that can be selected by the user when the user predetermines the meaning of characters "&&", where k<n and k>0). By entering the characters "&&", the password "test1234" can be entered by swapping 3 and 5[8-3]. That is, user 106 can input entered password 104 to computing device 102 as "&&te1ts234", where the "&&" character indicates to computing device 102 the entered password 104 is entered in a k and n-k character swap fashion.

In some examples, the "@@" character can indicate the version of the password is entered in such a manner that the password is to start on a particular character of the password. For example, the password for computing device 102 may be "test1234". The user 106 can enter the password starting at the k-th character where k can equal 3 (e.g., k is a constant selected by the user when the user predetermines the meaning of the characters "&&", where k indicates the letter of the character to start with when inputting the password where k<n (e.g., n is the number of characters in the password) and k>0). For example, the user 106 can enter the password starting on the third character (e.g., k=3) and, when finished, beginning at the first character up to but not including the third character. That is, user 106 can input entered password 104 to computing device 102 as "&&st1234te", where the "&&" character indicates to computing device 102 the entered password 104 is entered starting on a particular character of the password.

In some examples, the character that dictates the version of the password to be entered can be modified. For example, as described above, the character "&&" can dictate the password is to be entered in reverse. However, examples of the disclosure are not so limited. For example, the user 106 can enter a different character such that the version of the password to be entered can be changed. For instance, user 106 can enter character "$3#" and the entered password 104 to indicate to computing device 102 that rather than entering the password in reverse, the user 106 is entering the password 104 by starting on the $3^{rd}$ character followed by the $1^{st}$ and $2^{nd}$ characters after the $n^{th}$ character is entered, among other examples. A slightly different prefix such as "$4#" may be used to indicate that the user 106 is entering password 104 starting from the $4^{th}$ character followed by the $1^{st}$ to the $3^{rd}$ characters after the $n^{th}$ character is entered. In general, a prompt "$k#" may be used to indicate that the user 106 is entering password 104 starting from the $k^{th}$ character followed by the $1^{st}$ to the $(k-1)^{th}$ characters after the nth character is entered. Additionally, user 106 can modify the function of a particular special character. For example, user 106 can modify the function of the special character "&&" from dictating the password is to be entered in reverse to dictating the password is to be entered by starting on the third character, among other examples.

Although the version of the password is described above as including the password entered in reverse, a k and n-k character swap, and/or starting the password on a particular character of the password, examples of the disclosure are not so limited. For example, the version of the password to be entered can be any other version.

Computing device 102 can receive password 104. For example, as described above, user 106 can enter a version of the password to computing device 102 by including the special character in the password 104 via a user input to computing device 102. That is, the special character included in the entered password 104 indicates the version of the password that is entered.

Computing device 102 can generate, based on the special character included in the entered password 104, a transposed version of the entered password 104. Computing device 102 can generate the transposed version of entered password 104 by performing a transpose operation on entered password 104 based on the included special character, as is further described herein.

In some examples, the transpose operation can include reversing characters of the entered password 104. For example, as described above, the "&&" character can indicate the version of the password is to be entered in reverse (e.g., password is "test", entered password 104 is "&&tset"). The transpose operation performed by computing device 102 can include reversing the characters of entered password 104 (e.g., "&&tset" to "test").

In some examples, the transpose operation can include reversing a k and n-k character swap. For example, as described above, the "&&" character can indicate the version of the password is to be entered in a k and n-k character swap (e.g., password is "test", entered password 104 is "&&ttes"). The transpose operation performed by computing device 102 can include reversing the characters of entered password 104 (e.g., "&&ttes" to "test").

In some examples, the transpose operation can include reversing characters of the entered password 104. For example, as described above, the "&&" character can indicate the version of the password is to be entered by starting the password on a particular character of the password (e.g., password is "test", entered password 104 starts on the third character such that the entered password 104 is "&&stte"). The transpose operation performed by computing device 102 can include reversing the characters of entered password 104 (e.g., "stte" to "test").

Computing device 102 can compare the transposed version of the password input 104 to a stored password, as is further described herein. In some examples, the stored password can be stored external to computing device 102 in an authentication server. However, computing device can generate the transposed version of the password input 104 prior to comparing the transposed version of the password to the stored password and/or transmitting the transposed password to the authentication server for user authentication and/or authorization. Generating the transposed version of entered password 104 prior to comparing the transposed version of the password to the stored password can save on memory resources. For example, computing device 102, or a computing device (e.g., a server) external to computing device 102, can have one version of a stored password rather than many. That is, if the stored password is "test", and the entered password 104 is "&&tset", computing device 102 can transpose entered password 104 from "&&tset" to "test" and then compare the transposed password (e.g., "test") to the stored password (e.g., "test). Transposing the entered password 104 can prevent having to store a version of each transposed password.

As described above, computing device 102 can compare the transposed version of the entered password 104 to a stored password. Comparing the transposed version of the entered password 104 to the stored password, as is described above, can be done for ease of description. However, the transposed version of the entered password 104 and the stored password can be compared as hashed passwords, as is further described herein.

Computing device 102 can hash the transposed version of entered password 104. As used herein, the term "hash" refers to a one-way encryption of a password. For example, the transposed version of the entered password 104 can include a string of characters that can be hashed.

Computing device 102 can compare the hashed transposed version of entered password 104 to the stored password, where the stored password is also a hashed password. In response to the hashed transposed version of entered password 104 matching the hashed stored password, computing device 102 can grant access to user 106. In response to the hashed transposed version of entered password 104 not matching the hashed stored password, computing device 102 can deny access to user 106.

Transposed passwords according to the disclosure can allow for multiple versions of a password to be entered in order to grant or deny access to a computing device or computing system. The multiple versions of the entered password can prevent an unauthorized user, such as a user attempting a snooping attack, from observing an authorized user enter a password. Accordingly, a single snooping attack would not be able to compromise a computing device or an entire computing system, providing resiliency against snooping attacks. Further, modifying versions of passwords by modifying a displayed key or entered special character can dictate different versions of passwords to provide further security.

Figure 2A:
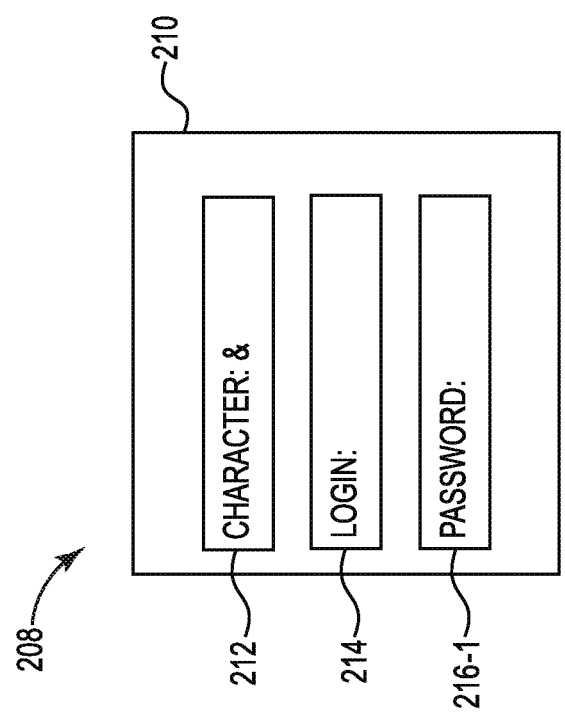
FIG. 2A illustrates an example user interface consistent with the disclosure.

FIG. 2A illustrates an example user interface 208 consistent with the disclosure. As illustrated in FIG. 2A, user interface 208 can be displayed on a display 210. Display 210 an include a displayed character 212, login 214, and password 216-1.

Display 210 can display character 212 to indicate a version of a password 216-1 to be entered. For example, as illustrated in FIG. 2A, character 212 can be an ampersand (e.g., "&"). The displayed "&" character 212 can indicate a version of a password to be entered. As previously described in connection with FIG. 1, the version of the password can be the password entered in reverse, the password entered in a k and n-k character swap, the password entered by entering the password starting on a particular character of the password, among other versions.

For example, the "&" character 212 can indicate the version of the password 216-1 is to be entered in reverse. Therefore, a user can observe the displayed character 212, enter login information 214, and enter password 216-1 based on the version of the password indicated by the "&" character 212. For example, the password can be "test". The user can observe the "&" character 212 (e.g., indicating the version of the password "test" is to be entered in reverse), enter login information 214, and enter password 216-1 as "tset". The computing device can then generate a transposed version of the entered password 216-1, compare the transposed version of the password to a stored password, and grant access based on the comparison, as previously described in connection with FIG. 1.

FIG. 2B illustrates an example user interface 217 consistent with the disclosure. As illustrated in FIG. 2B, user interface 217 can be displayed on a display 210. Display 210 an include login 214 and password 216-2.

Display 210 can include login 214 and password 216-2. A user can enter login information 214 and a password 216-2, where the entered password 216-2 can include a special character to indicate a version of a password that is being entered. As previously described in connection with FIG. 1, the version of the password can be the password entered in reverse, the password entered in a k and n-k character swap, the password entered by entering the password starting on a particular character of the password, among other versions.

For example, the user can enter login information 214, and enter password 216-2, where the entered password 216-2 includes the special character "&&". For example, the password can be "test" and the special character "&&" can indicate the password is being entered in reverse. Accordingly, the user can enter password 216-2 as "&&tset". The computing device can then generate a transposed version of the entered password 216-2, compare the transposed version of the password to a stored password, and grant access based on the comparison, as previously described in connection with FIG. 1.

Figure 3:
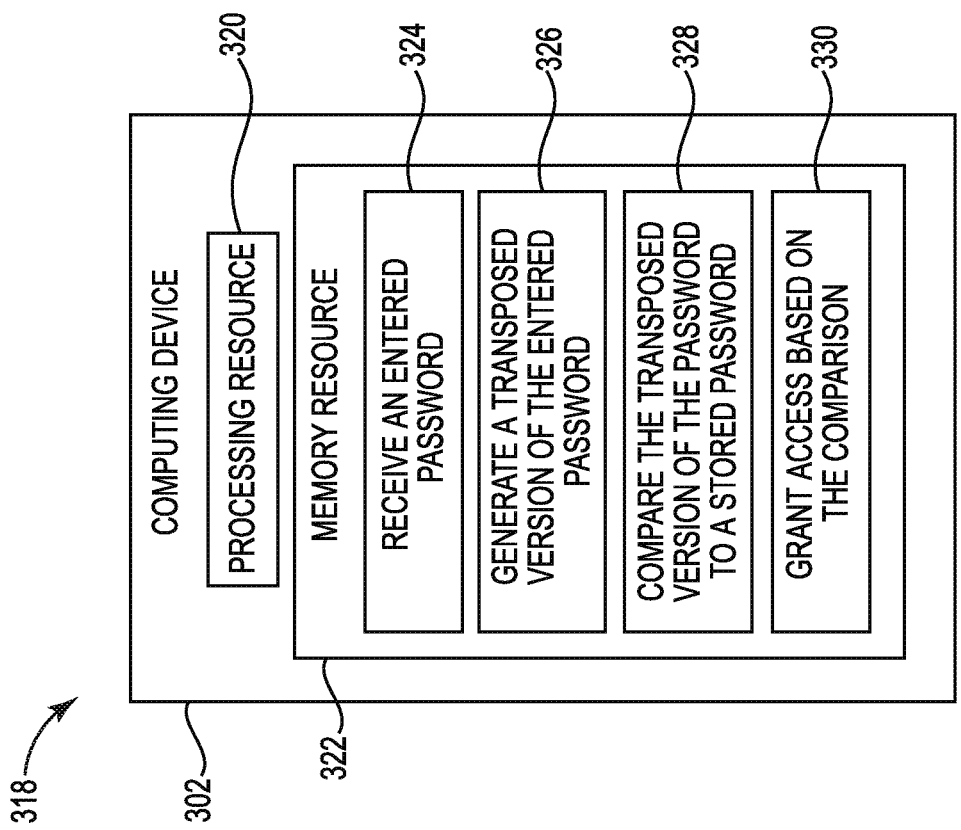
FIG. 3 is a block diagram of an example computing device for transposed passwords consistent with the disclosure.

FIG. 3 is a block diagram 318 of an example computing device 302 for transposed passwords consistent with the disclosure. As described herein, the computing device 302 may perform a number of functions related to transposed passwords. Although not illustrated in FIG. 3, the computing device 302 may include a processor and a machine-readable storage medium. Although the following descriptions refer to a single processor and a single machine-readable storage medium, the descriptions may also apply to a system with multiple processors and multiple machine-readable storage mediums. In such examples, the computing device 302 may be distributed across multiple machine-readable storage mediums and the computing device 302 may be distributed across multiple processors. Put another way, the instructions executed by the computing device 302 may be stored across multiple machine-readable storage mediums and executed across multiple processors, such as in a distributed or virtual computing environment.

As illustrated in FIG. 3, the computing device 302 may comprise a processing resource 320, and a memory resource 322 storing machine-readable instructions to cause the processing resource 320 to perform a number of operations relating to transposed passwords. That is, using the processing resource 320 and the memory resource 322, the computing device 302 may grant access to a computing device based on a comparison of a transposed version of an entered password to a stored password, among other operations. Processing resource 320 may be a central processing unit (CPU), microprocessor, and/or other hardware device suitable for retrieval and execution of instructions stored in memory resource 322.

The computing device 302 may include instructions 324 stored in the memory resource 322 and executable by the processing resource 320 to receive an entered password. The entered password can be a string of characters and can be input to computing device 302 via a user input.

The computing device 302 may include instructions 326 stored in the memory resource 322 and executable by the processing resource 320 to generate a transposed version of the entered password. That is, the computing device 302 may include instructions 326 stored in the memory resource 322 and executable by the processing resource 316 to generate, based on the entered password, a transposed version of the entered password. In some examples, computing device 302 can generate the transposed version of the entered password, where the entered password is based on a character displayed to a user on a display such that the user enters a version of the password based on the displayed character. In some examples, computing device 302 can generate the transposed version of the entered password based on a special character included in the password by the user when the user enters the password.

The computing device 302 may include instructions 328 stored in the memory resource 322 and executable by the processing resource 320 to compare the transposed version of the password to a stored password. For example, following a transpose operation being performed on the entered password to generate the transposed version of the password, the transposed version of the password can be compared to the stored password. The transposed version of the password can be hashed, and compared to the stored password, which can also be a hashed password.

The computing device 302 may include instructions 330 stored in the memory resource 322 and executable by the processing resource 320 to grant access based on the comparison. For example, if the transposed version of the password matches the stored version of the password, computing device 302 can grant access. If the transposed version of the password does not match the stored version of the password, computing device 302 can deny access.

In this manner, the computing device 302 can grant or deny access to a computing device utilizing transposed passwords. Using transposed passwords can increase security.

Figure 4:
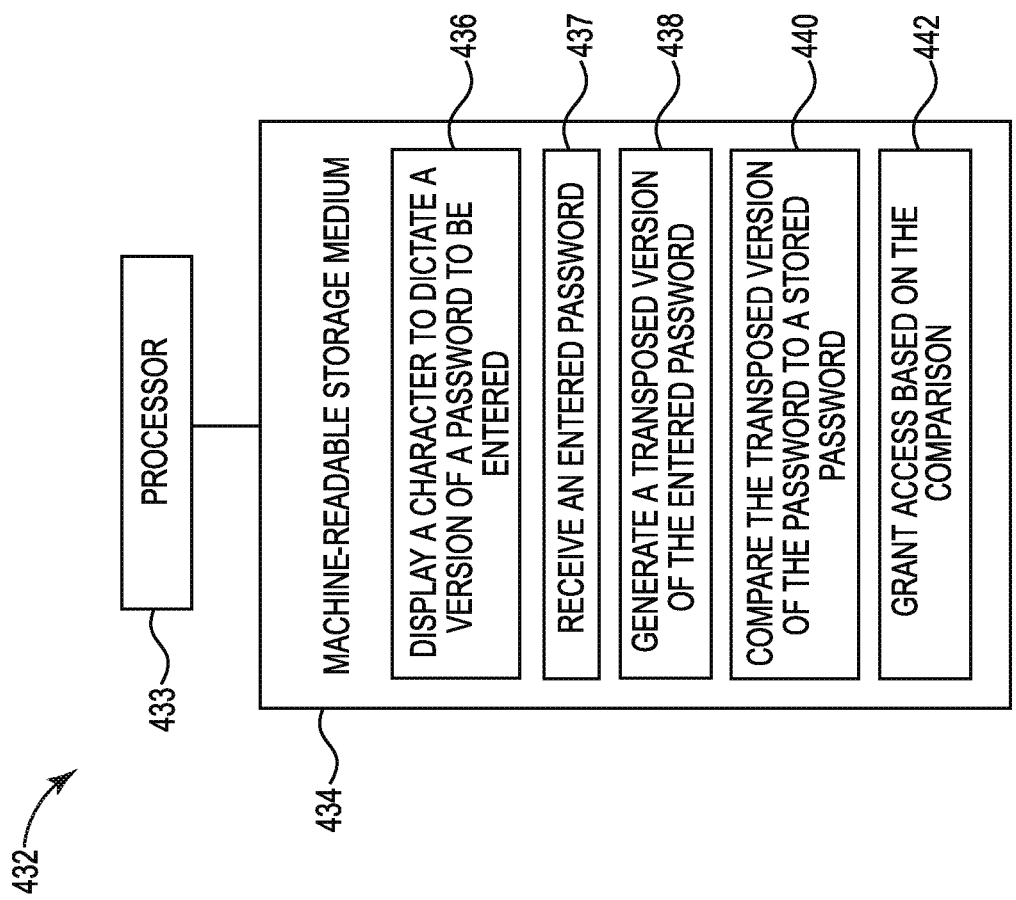
FIG. 4 is a block diagram of an example system consistent with the disclosure.

FIG. 4 is a block diagram of an example system 432 consistent with the disclosure. In the example of FIG. 4, system 432 includes a processor 433 and a machine-readable storage medium 434. Although the following descriptions refer to a single processor and a single machine-readable storage medium, the descriptions may also apply to a system with multiple processors and multiple machine-readable storage mediums. In such examples, the instructions may be distributed across multiple machine-readable storage mediums and the instructions may be distributed across multiple processors. Put another way, the instructions may be stored across multiple machine-readable storage mediums and executed across multiple processors, such as in a distributed computing environment.

Processor 433 may be a central processing unit (CPU), microprocessor, and/or other hardware device suitable for retrieval and execution of instructions stored in machine-readable storage medium 434. In the particular example shown in FIG. 4, processor 433 may receive, determine, and send instructions 436, 438, 440, and 442. As an alternative or in addition to retrieving and executing instructions, processor 433 may include an electronic circuit comprising a number of electronic components for performing the operations of the instructions in machine-readable storage medium 434. With respect to the executable instruction representations or boxes described and shown herein, it should be understood that part or all of the executable instructions and/or electronic circuits included within one box may be included in a different box shown in the figures or in a different box not shown.

Machine-readable storage medium 434 may be any electronic, magnetic, optical, or other physical storage device that stores executable instructions. Thus, machine-readable storage medium 434 may be, for example, Random Access Memory (RAM), an Electrically-Erasable Programmable Read-Only Memory (EEPROM), a storage drive, an optical disc, and the like. The executable instructions may be "installed" on the system 432 illustrated in FIG. 4. Machine-readable storage medium 434 may be a portable, external or remote storage medium, for example, that allows the system 432 to download the instructions from the portable/external/remote storage medium. In this situation, the executable instructions may be part of an "installation package". As described herein, machine-readable storage medium 434 may be encoded with executable instructions for transposed passwords.

Display instructions 436, when executed by a processor such as processor 433, may cause system 432 to display a character to dictate a version of a password to be entered. For example, a display of a computing device can display a character. The character can be any character that can indicate to a user a version of a password to be entered. For example, the displayed character can be an ampersand. The displayed character (e.g., "&") can indicate a version of a password to be entered. The version of the password can be the password entered in reverse, the password entered in a k and n-k character swap, the password entered by entering the password starting on a particular character of the password, among other versions.

Receive instructions 437, when executed by a processor such as processor 433, may cause system 432 to receive an entered password. The entered password can be a string of characters and can be input to computing device 302 via a user input.

Generate instructions 438, when executed by a processor such as processor 433, may cause system 432 to generate, based on the displayed character, a transposed version of the entered password. For example, the displayed character (e.g., "&") can indicate the password is to be entered in reverse (e.g., password is "test", password is entered in reverse "tset"). Based on the password being entered in reverse, system 432 can perform a transpose operation to reverse the password that was entered in reverse. In some examples, the displayed character can cause the entered password to be entered in a k and n-k character swap, the password to be entered by entering the password starting on a particular character of the password, etc. The transpose operation can reverse the k and n-k character swap, reverse the password entered starting on the particular character of the password, etc.

Compare instructions 440, when executed by a processor such as processor 433, may cause system 432 to compare the transposed version of the password to a stored password. For example, following a transpose operation being performed on the entered password to generate the transposed version of the password, the transposed version of the password can be compared to the stored password. The transposed version of the password can be hashed, and compared to the stored password, which can also be a hashed password.

Grant instructions 442, when executed by a processor such as processor 433, may cause system 432 to grant access based on the comparison. For example, if the transposed version of the password matches the stored version of the password, system 432 can grant access. If the transposed version of the password does not match the stored version of the password, system 432 can deny access.

FIG. 5 illustrates an example method 554 consistent with the disclosure. Method 554 may be performed, for example, by a computing device (e.g., computing device 102, 302, previously described in connection with FIGS. 1 and 3, respectively).

At 546, the method 544 may include receiving, by a computing device, an entered password. The entered password can include a special character to indicate a version of a password to be entered. For example, the entered password can include a special character to indicate a version of a password that is being entered. The included special character can indicate the version of the password can be the password entered in reverse, the password entered in a k and n-k character swap, the password entered by entering the password starting on a particular character of the password, among other versions.

At 548, the method 544 may include generating a transposed version of the entered password. For example, the computing device can generate the transposed version of the entered password based on the special character included in the entered password. For example, the included special character (e.g., "&&") can indicate the password is entered in reverse (e.g., password is "test", entered password is "&&tset"). Based on the special character and the password being entered in reverse, the computing device can perform a transpose operation to reverse the password that was entered in reverse. In some examples, the entered special character can cause the entered password to be entered in a k and n-k character swap, the password to be entered by entering the password starting on a particular character of the password, etc. The transpose operation can reverse the k and n-k character swap, reverse the password entered starting on the particular character of the password, etc.

At 550, the method 544 may include comparing the transposed version of the password to a stored password. For example, following a transpose operation being performed on the entered password to generate the transposed version of the password, the transposed version of the password can be compared to the stored password. The transposed version of the password can be hashed, and compared to the stored password, which can also be a hashed password.

At 552, the method 544 may include granting access based on the comparison in response to the transposed version of the password matching the stored password. For example, if the transposed version of the password matches the stored version of the password, the computing device can grant access. If the transposed version of the password does not match the stored version of the password, the computing device can deny access.

The method 544 can include modifying, by the computing device, the special character such that the special character indicates a different version of the password to be entered. For example, as previously described above, the special character "&&" can be included in the password to indicate the password is being entered in reverse (e.g., password is "test", entered password is "&&tset"). The special character && can be modified such that, instead of the special character "&&" indicating the password is being entered in reverse, the special character "&&" indicates the password is being entered using a k and n-k character swap, among other examples.

The method 544 can include modifying the special character after a predetermined amount of time. For example, the special character && can be modified after a predetermined amount of time (e.g., 15 days) such that, instead of the special character "&&" indicating the password is being entered in reverse, the special character "&&" indicates the password is being entered using a k and n-k character swap, among other examples.

The method 544 can include modifying the special character in response to a user input. For example, the special character && can be modified in response to a user modifying the special character such that, instead of the special character "&&" indicating the password is being entered in reverse, the special character "&&" indicates the password is being entered using a k and n-k character swap, among other examples.

In the foregoing detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

The figures herein follow a numbering convention in which the first digit corresponds to the drawing figure number and the remaining digits identify an element or component in the drawing. Similar elements or components between different figures may be identified by the use of similar digits. For example, 102 may reference element "02" in FIG. 1, and a similar element may be referenced as 202 in FIG. 2. Elements shown in the various figures herein can be added, exchanged, and/or eliminated so as to provide a plurality of additional examples of the present disclosure. In addition, the proportion and the relative scale of the elements provided in the figures are intended to illustrate the examples of the present disclosure, and should not be taken in a limiting sense.

What is claimed:

1. A computing device, comprising:
   a processing resource; and
   a non-transitory machine-readable storage medium storing instructions executable by the processing resource to:
   cause display of a character, wherein the character dictates an altered version of a password to be entered, wherein the password includes a string of characters in a given order;
   receive a user-entered password comprising the altered version of the password based on an alteration of the password made by a user when inputting the user-entered password based on the displayed character, the alteration of the password comprising changing an order of characters in the string of characters wherein the changed order of characters is different from the given order, and wherein the displayed character dictates that the alteration of the password comprises starting the altered version of the password with a first character that is different from a starting character of the password, wherein the first character is part of the password;

generate, based on the displayed character, a transposed version of the user-entered password by reversing the alteration of the password made by the user, wherein the reversing of the alteration of the password comprises modifying the changed order of characters to revert back to the given order of characters in the string of characters;

compare the transposed version of the user-entered password to a stored password, the transposed version of the user-entered password comprising an unaltered version of the password; and grant access based on the comparison.

2. The computing device of claim 1, wherein the reversing of the alteration of the password comprises reversing a k and n-k character swap.

3. The computing device of claim 1, wherein the alteration of the password comprises reversing characters of the password by the user.

4. The computing device of claim 1, wherein the instructions are executable by the processing resource to hash the transposed version of the user-entered password.

5. The computing device of claim 4, wherein the instructions to compare the transposed version of the user-entered password to the stored password include instructions to compare the hashed transposed version of the user-entered password to the stored password, wherein the stored password is a hashed stored password.

6. The computing device of claim 1, wherein the instructions to grant access based on the comparison include instructions to grant access in response to the transposed version of the user-entered password matching the stored password.

7. The computing device of claim 1, wherein the instructions to grant access based on the comparison include instructions to deny access in response to the transposed version of the user-entered password not matching the stored password.

8. A non-transitory computer readable medium storing instructions executable by a processing resource to cause the processing resource to:

cause display of a character, wherein the character dictates an altered version of a password to be entered, wherein the password includes a string of characters in a given order;

receive a user-entered password comprising the altered version of the password based on an alteration of the password made by a user when inputting the user-entered password based on the displayed character, the alteration of the password comprising changing an order of characters in the string of characters wherein the changed order of characters is different from the given order, and wherein the displayed character dictates that the alteration of the password comprises starting the altered version of the password with a first character that is different from a starting character of the password, wherein the first character is part of the password;

generate, based on the displayed character, a transposed version of the user-entered password by reversing the alteration of the password made by the user, wherein the reversing of the alteration of the password comprises modifying the changed order of characters to revert back to the given order of characters in the string of characters;

compare the transposed version of the password to a stored password; and grant access based on the comparison.

9. The non-transitory computer readable medium of claim 8, wherein the reversing of the alteration of the password includes reversing a k and n-k character swap.

10. The non-transitory computer readable medium of claim 8, wherein the alteration of the password includes entering characters of the password in reverse.

11. The non-transitory computer readable medium of claim 8, wherein the instructions are executable by the processing resource to:

after the display of the character, cause display of a second character different from the character, the second character dictating a different altered version of the password to be entered by the user.

12. A method comprising:

receiving, by a computing device, a user-entered password comprising an altered version of a password based on an alteration of the password made by a user when inputting the user-entered password, wherein the user-entered password includes a special character indicating the alteration made by the user;

generating, by the computing device based on the special character included in the user-entered password, a transposed version of the user-entered password, the transposed version of the user-entered password comprising an unaltered version of the password, and the generating of the transposed version of the user-entered password comprises reversing the alteration of the password made by the user, wherein the reversing of the alteration of the password comprises reversing a k and n-k character swap;

comparing, by the computing device, the transposed version of the user-entered password to a stored password; and granting, by the computing device, access based on the comparison in response to the transposed version of the user-entered password matching the stored password.

13. The method of claim 12, comprising:

hashing, by the computing device, the transposed version of the user-entered password, wherein comparing the transposed version of the user-entered password to the stored password comprises comparing the hashed transposed version of the user-entered password to the stored password, wherein the stored password is a hashed stored password.

* * * * *